April 5, 1966 — SUSUMU UEHARA — 3,245,000

AMPLIFIER CIRCUIT FOR BROADENING LOW FREQUENCY REPRODUCTION OF A SPEAKER

Filed March 18, 1963 — 3 Sheets-Sheet 1

INVENTOR.
Susumu Uehara
BY Wenderoth, Lind & Ponack
ATTORNEYS

INVENTOR.
Susumu Uehara
BY Wenderoth, Lind & Ponack
ATTORNEYS

INVENTOR.
Susumu Uehara
BY Wenderoth, Lind & Ponack
ATTORNEYS

United States Patent Office 3,245,000

Patented Apr. 5, 1966

3,245,000

AMPLIFIER CIRCUIT FOR BROADENING LOW FREQUENCY REPRODUCTION OF A SPEAKER

Susumu Uehara, 14–2 Aza Higashi-yama Maitani, Takarazuka, Japan

Filed Mar. 18, 1963, Ser. No. 265,714
Claims priority, application Japan, Mar. 22, 1962, 37/11,702
5 Claims. (Cl. 330—109)

The present invention relates to a circuit for an amplifier capable of broadening the ability of a speaker to reproduce low frequencies.

Heretofore when a cone type speaker is employed in an electric acoustic reproduction apparatus for reproducing music, voice and sound, the acoustic reproducing capacity for frequencies lower than the lowest resonance frequency $f_0$, that is peculiar to the speaker deteriorates rather quickly. In order to broaden the reproduction capacity and attain a good acoustic reproduction capacity for the sound of low frequencies, the said lowest resonance frequency $f_0$ must be chosen in the low frequencies.

However, because of the structural requirements of the speaker, its durability and the restrictions imposed by the dimensions of the cabinet that contains the speaker, there is a limit to how far $f_0$ can be lowered. Consequently most of the conventional apparatuses lack sufficient reproduction capacity and it has been desired to eliminate such defects. The present invention relates to a circuit for an amplifier for obtaining an output voltage which is composed of the output of the amplifier and a voltage proportional to the speed of motion of the voice coil of the speaker, which output voltage is used as negative feed-back which can further broaden the range of acoustic reproduction of the speaker at frequencies lower than the lowest resonance frequency $f_0$.

Figure 2:
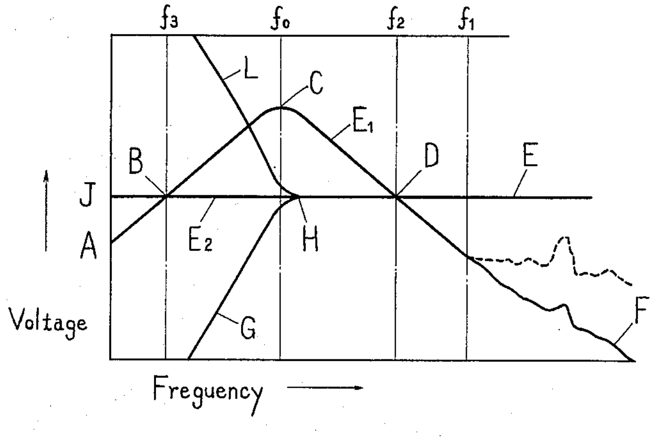
FIG. 2 is a graph illustrating the operation of the circuit of FIG. 1.
Figure 3:
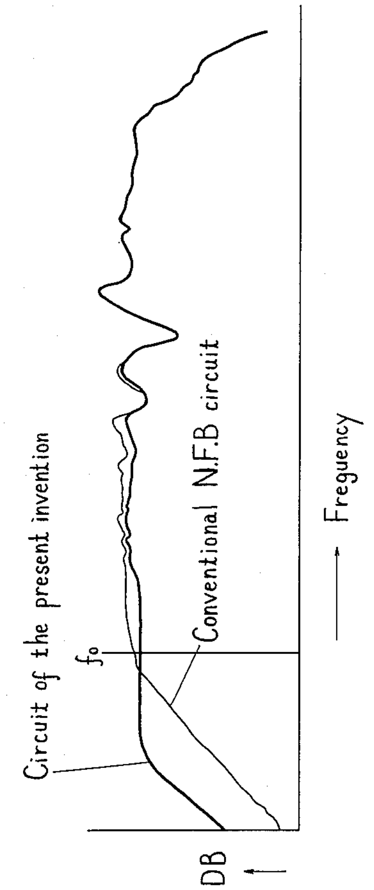
FIG. 3 shows a comparison between the combined acoustic characteristics at different frequencies for a speaker with a conventional amplifier circuit and a speaker with an amplifier circuit according to the present invention.

The thus composed output voltage when used as negative feed-back causes the acoustic reproduction capacity of the speaker, which declines for frequencies lower than the lowest resonance frequency, to select by a very simple means and with the aid of a bypass filter a feed-back band so as to make uniform all the acoustic characteristics inclusive of the said broadened band of low frequencies. The invention is characterized by feeding the output voltage of the amplifier to a bridge circuit which includes the voice coil of the speaker, detecting the voltage $E_1$, as shown in FIGURE 2, from which the voltage drop due to the direct current resistance of the voice coil is eliminated and which is nearly proportional to the speed of the oscillation of the voice coil and, after combining the said voltage with a part of the output voltage $E_2$ of the amplifier, as shown in FIGURE 2, cutting off by means of a high pass filter the frequencies that are lower than the frequency $f_2$, which is a frequency in the frequencies that are higher than the lowest resonance frequency $f_0$ of the speaker where the voltages $E_1$ and $E_2$ will be equal, and feeding the resulting voltage as negative feedback to the amplifier. Frequency $f_3$ is a frequency in the frequencies that are lower than the lowest resonance frequency $f_0$ of the speaker where the voltages $E_1$ and $E_2$ will be equal.

The object of the present invention is to provide a circuit for the amplifier which is capable of compensating the acoustic reproduction capacity in accordance with the acoustic reproduction characteristics of individual speakers and broadening the acoustic reproduction capacity of the low frequency band, while eliminating the resonant sound and producing a flat acoustic power, which makes the negative feedback automatically correct the acoustic reproduction distortion of the speaker according to the acoustic distortion, and which can be used in any speaker.

Figure 1:
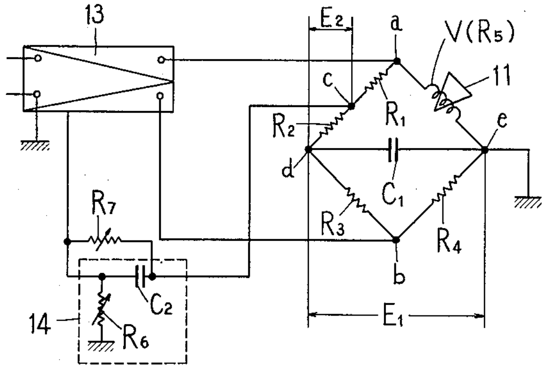
FIG. 1 is a wiring diagram of a first embodiment of the circuit of the present invention.

In FIG. 1, the output power of the amplifier 13 is fed to the two junctions *a* and *b* of the bridge circuit that consists of the voice coil V in one leg, two resistances $R_1$ and $R_2$ in the second leg and resistances $R_3$ and $R_4$ in the third and fourth legs. The respective resistance values will be chosen for the direct current resistance $R_5$ of the voice coil so as to produce the following relationship $$\frac{R_1+R_2}{R_3}=\frac{R_5}{R_4}$$

The voltage $E_1$ which is the resulting voltage after having eliminated the voltage drop across the voice coil by balancing the voltage drop due to the direct current flowing through the voice coil—the voltage $E_1$ being equal to the counter electromotive force generated by the oscillation of the voice coil within the magnetic field, i.e. a voltage proportional to the speed of motion of the voice coil—will be generated at the other two junctions *d* and *e* of the bridge.

Since the voltage at junctions *a* and *b* of the bridge is definite at the respective frequencies and, in the frequencies within which the speaker cone that includes the voice coil is regarded as performing a nearly piston movement, the voltage $E_1$ detected in the bridge is nearly proportional to the speed of the oscillation of the voice coil, the value of the voltage $E_1$ that corresponds to the variation of the frequency will become the greatest in the lowest resonance frequency $f_0$ of the speaker cone as shown in FIGURE 2, and for the frequencies that are above and below $f_0$, it will follow a curve such as the curve A B C D F where the voltage will attenuate at the rate of about 6 db per octave.

The frequency band within which the speaker cone is considered to perform nearly a piston movement varies according to different speakers. But, generally this band is limited to about the middle of the audio frequency band which, for instance, is lower than the frequency $f_1$ by about 300–600 c./s. Frequency $f_1$ is thus the frequency below which the cone performs nearly a piston movement. In case of the band that is higher than $f_1$, $E_1$ will form an irregular attenuation curve as shown by the dotted line in FIGURE 2, because of the counter electromotive force due to the split oscillation of the speaker cone and the inductance of the voice coil and other reasons.

Since this voltage is unstable in the frequency band that is higher than the frequency $f_1$, it is eliminated by the condenser $C_1$ which is connected between two points *d* and *e* of the bridge, and this voltage $E_1$ is combined with the voltage $E_2$ that is between both ends of the resistance $R_2$ in order to get the combined voltage $E_3$ as shown by J B C D E. When the voltage across *a* and *b* is definite at each frequency, the voltage $E_2$ will have a definite value, because of its having no frequency characteristics. If the ratio between $R_1$ and $R_2$ is chosen appropriately and also the voltage $E_2$ is chosen so as to be equal to the voltage $E_1$ at the frequencies $f_3$ and $f_2$ that are respectively below and above the lowest resonance frequency $f_0$, the voltage versus frequency characteristics of the combined voltage $E_3$ can be adjusted so as to be on curve J B C D E of FIGURE 2.

The curve of the adjusted voltage peaks between $f_2$ and $f_3$, showing the characteristics of the voltage $E_1$ and becomes nearly flat in the frequencies that are lower than $f_3$ and higher than $f_2$ according to the characteristics of the voltage $E_2$. The lowest resonance frequency is the one that is determined by the speaker and cabinet and is not definite. Usually it is between 30 and 120 c./s. and both $f_2$ and $f_3$ will be different depending on the particular apparatus. If the low frequency cut-off frequency is adjusted to $f_2$ by the high pass filter that can continuously vary the frequency, the built-up characteristics of the combined negative feedback voltage between $f_2$ and $f_0$ will be given a flat characteristic by the high pass filter and the combined feedback voltage that is lower than $f_0$ will have the attenuation characteristics of the filter in addition to its proper drop characteristics, so that it will have a characteristic like curve E H G. Consequently, the external gain of the amplifier will have a build up characteristic curve in the frequencies lower than $f_0$ as shown by E H L. Since the reproduced sound in the speaker attenuates exactly in the same proportion as the curve E H L, the sound pressure characteristics of the low frequency part will be improved and will compensate the sound reproduction capacity of the speaker for a frequency lower than the frequency $f_0$ which otherwise rapidly attenuates, enlarging the sound reproducing ability in the lower frequencies. The lowest resonance frequency $f_0$ of the speaker cone varies depending on the different speakers, as well as the materials that make up the cabinet and its capacity. According to the present invention, however, in the amplifier used for any speaker, the above-mentioned object or enlarging the sound reproducing capacity can be attained by the simple circuit and adjustment of the cut-off frequency of the high pass filter by the continuous change of the resistance $R_6$.

In addition, whenever necessary, $R_6$ can be fixed, while $C_2$ can be varied to attain a similar effect. Further, a more minute adjustment effect can be obtained by connecting the resistance $R_7$ in parallel with the condenser $C_2$ to restrict the cut-off capacity of the high pass filter and controlling the build-up of the gain in the low sound range of the amplifier.

Figure 4:
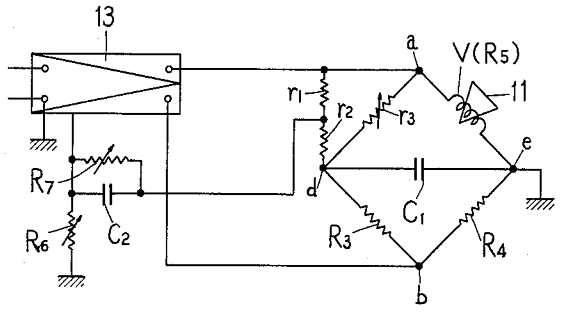
FIGS. 4 and 5 are the wiring diagrams for other embodiments of circuits of the invention.
Figure 5:
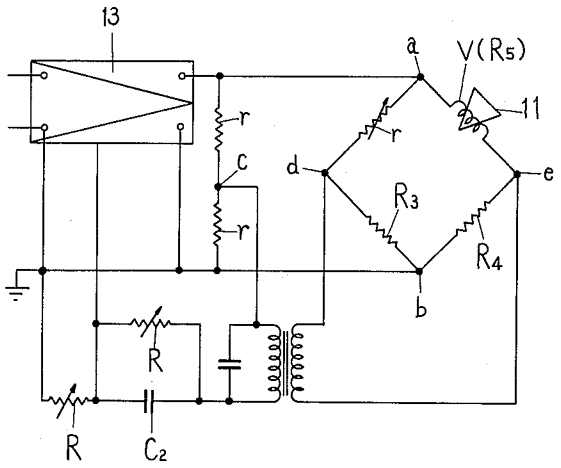

The circuit of the present invention can be altered as shown in FIGURE 4 so as to make the combined resistance of $R_1$, $R_2$ and $R_3$ equal to $R_1+R_2$ of FIGURE 1, and its performance will remain exactly same. However this makes it easy to attain a balance of the bridge circuit. The same result may also be obtained by detecting the voltage between *d* and *e* of the bridge through a small-sized transformer as shown by FIGURE 5, combining the said voltage with a part of the output voltage of the amplifier and passing it through the high pass filter for the negative feedback as in the above-mentioned first and second examples.

While a preferred embodiment of the invention has been shown and described, many modifications thereof can be made by one skilled in the art without departing from the spirit of the invention and it is desired to protect by Letters Patent all forms of the invention falling within the scope of the following claims:

What I claim is:

1. A circuit for an amplifier for broadening the ability of a speaker to reproduce low frequencies, comprising a four part bridge circuit having the speaker voice coil forming one leg thereof, and having input connections at one pair of diametrically opposite junctions, an amplifier having its output coupled across said input connections, means coupled to said bridge circuit for extracting from said bridge circuit an output voltage from which the voltage drop due to the direct current resistance of the voice coil is eliminated and which is nearly proportional to the speed of oscillation of the voice coil and with which a part of the output voltage of the amplifier has been combined, and a high pass filter coupled to said means and coupled to the amplifier to feed the output voltage to the amplifier as a negative feed-back voltage, said filter filtering out all frequencies above the frequency at which the speaker cone performs nearly a piston movement.

2. A circuit as claimed in claim 1 further comprising a condenser connected between the remaining junctions of said bridge circuit.

3. A circuit as claimed in claim 1 in which the speaker coil is connected to one junction of said one pair of junctions and the other part of said bridge circuit connected to said one junction comprises two resistances, and said means for extracting the output voltage from said bridge is connected between said resistances.

4. A circuit as claimed in claim 1 in which the speaker coil is connected to one junction of said one pair of junctions and the other part of said bridge circuit connected to said one junction comprises a variable resistance, said means for extracting the output voltage from said bridge being connected to the junction at the other end of said variable resistance from said one junction and comprising a first resistance, a second resistance connected between said first resistance and said one junction, and a connection from between said resistances to said high pass filter.

5. A circuit for an amplifier for broadening the ability of a speaker to reproduce low frequencies, comprising a four part bridge circuit having input connections at one pair of diametrically opposite junctions, the speaker coil forming one leg of said bridge circuit and being connected to one junction of said one pair of junctions, the other part of said bridge circuit connected to said one junction of said one pair of junctions comprising a variable resistance, an amplifier having its output coupled across said input connections, means coupled to said bridge circuit for extracting from said bridge circuit an output voltage from which the voltage drop due to the direct current resistance of the voice coil is eliminated and which is nearly proportional to the speed of oscillation of the voice coil and with which a part of the output voltage of the amplifier has been combined, said extracting means comprising a transformer having one side connected across the other pair of junctions of said bridge and having a condenser connected across the other side, and a high pass filter coupled to one end of the other side of said transformer and coupled to said amplifier to feed the output voltage to the amplifier as a negative feed-back voltage, a circuit between said junctions of said one pair of junctions and containing two resistances in series, the other end of said other side of the transformer coupled to said circuit between the said junctions at a point between said resistances.

References Cited by the Examiner

UNITED STATES PATENTS

| | | | |
|---|---|---|---|
| 2,358,630 | 9/1944 | Fay | 179—1 |
| 2,658,958 | 11/1953 | Wells | 330—109 |
| 2,843,671 | 7/1958 | Wilkins et al. | 330—102 X |
| 3,148,339 | 9/1964 | Bell et al. | 330—69 |

ROY LAKE, *Primary Examiner*.